(12) United States Patent
Cheng (10) Patent No.: US 10,943,543 B2
(45) Date of Patent: Mar. 9, 2021

(54) ARRAY SUBSTRATE, DISPLAY PANEL AND DISPLAY DEVICE

(71) Applicant: BOE Technology Group Co., Ltd., Beijing (CN)

(72) Inventor: Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 16/336,381

(22) PCT Filed: Aug. 20, 2018

(86) PCT No.: PCT/CN2018/101261
§ 371 (c)(1),
(2) Date: Mar. 25, 2019

(87) PCT Pub. No.: WO2019/095759
PCT Pub. Date: May 23, 2019

(65) Prior Publication Data
US 2020/0357343 A1    Nov. 12, 2020

(30) Foreign Application Priority Data
Nov. 16, 2017  (CN) .......................... 201721540228.5

(51) Int. Cl.
  *G09G 3/3275* (2016.01)
  *G06F 1/18* (2006.01)
  *G09G 3/36* (2006.01)

(52) U.S. Cl.
  CPC .......... *G09G 3/3275* (2013.01); *G06F 1/182* (2013.01); *G06F 1/189* (2013.01); *G09G 3/3688* (2013.01)

(58) Field of Classification Search
  CPC .. G09G 3/3266; G09G 3/3275; G09G 3/3674; G09G 3/3677; G09G 3/3681;
  (Continued)

(56) References Cited

U.S. PATENT DOCUMENTS 5,606,340 A * 2/1997 Suzuki ................. G09G 3/3688
  345/87
5,805,246 A * 9/1998 Lee .................... G02F 1/136204
  349/40
(Continued)

FOREIGN PATENT DOCUMENTS

CN  101078845 A  11/2007
CN  101114069 A  1/2008
(Continued)

OTHER PUBLICATIONS

International Search Report and Written Opinion of the international Searching Authority (with English language translation of Written Opinion), International Application No. PCT/CN2018/101261, dated Nov. 14, 2018, 12 pp.

*Primary Examiner* — Dong Hui Liang
(74) *Attorney, Agent, or Firm* — Myers Bigel, P.A.

(57) ABSTRACT

An array substrate includes a display area, a non-display area other than the display area, a plurality of signal lines located in the display area, and a plurality of signal line leads located in the non-display area and connected to respective ones of the plurality of signal lines. Each of the signal line leads includes a lead body and a first block connected to the lead body, and the first block has an area greater than or equal to an area of a square with a side length that is 5 times a width of the signal line.

18 Claims, 10 Drawing Sheets

(58) Field of Classification Search
CPC .. G09G 3/3685; G09G 3/3688; G09G 3/3692; G09G 2310/0281; G09G 2320/0219; G09G 2320/0223
See application file for complete search history.

(56) References Cited

U.S. PATENT DOCUMENTS

| | | | |
|---|---|---|---|
| 2007/0273802 | A1 | 11/2007 | Nakamura |
| 2010/0156770 | A1* | 6/2010 | Shin ..................... G09G 3/3648 345/87 |
| 2010/0225624 | A1* | 9/2010 | Fu ........................... G09G 3/20 345/205 |
| 2012/0181539 | A1* | 7/2012 | Han ........................ G09G 3/20 257/59 |
| 2016/0071884 | A1* | 3/2016 | Miyamoto ........ G02F 1/136227 257/59 |
| 2016/0252756 | A1 | 9/2016 | Fu |
| 2017/0185194 | A1* | 6/2017 | Kim ..................... G06F 3/0416 |
| 2017/0337873 | A1* | 11/2017 | Kim .................... H01L 27/3258 |
| 2018/0083072 | A1* | 3/2018 | Kwon ................. H01L 27/3211 |
| 2019/0019441 | A1* | 1/2019 | Shin .................... H01L 27/3276 |
| 2019/0096979 | A1* | 3/2019 | Jo ....................... H01L 27/3258 |

FOREIGN PATENT DOCUMENTS

| | | |
|---|---|---|
| CN | 101202278 A | 6/2008 |
| CN | 102654699 A | 9/2012 |
| CN | 103928456 A | 7/2014 |
| CN | 104035217 A | 9/2014 |
| CN | 104615322 A | 5/2015 |
| CN | 106200172 A | 12/2016 |
| CN | 207517281 U | 6/2018 |
| JP | 2004247533 A | 9/2004 |

* cited by examiner

ARRAY SUBSTRATE, DISPLAY PANEL AND DISPLAY DEVICE

CROSS-REFERENCE TO RELATED APPLICATIONS

This application is a 35 U.S.C. 371 national stage application of PCT International Application No. PCT/CN2018/101261, filed on Aug. 20, 2018, which claims the benefit of Chinese Patent Application No. 201721540228.5, filed on Nov. 16, 2017, the contents of which are incorporated herein by reference in their entireties.

TECHNICAL FIELD

The present disclosure relates to the field of display technologies, and in particular, to an array substrate, a display panel, and a display device.

BACKGROUND

An array substrate, which is an integral part of a display device, can be generally divided into a display area in which an array of pixels is disposed and a non-display area other than the display area. In general, a large number of wires are arranged in the non-display area.

SUMMARY

According to an aspect of the present disclosure, an array substrate is provided, comprising a display area, a non-display area other than the display area, a plurality of signal lines in the display area, and a plurality of signal line leads in the non-display area and connected to respective ones of the plurality of signal lines. Each of the signal line leads comprises a lead body and a first block connected to the lead body, the first block having an area greater than or equal to an area of a square with a side length that is 5 times a width of the signal line.

In some embodiments, the signal lines comprise gate lines, and the signal line leads comprise gate line leads.

In some embodiments, the first block has a size in a direction intersecting a direction in which the gate lines extend, the size being smaller than a distance between two adjacent ones of the gate lines and greater than or equal to ⅓ of the distance between the two adjacent ones of the gate lines.

In some embodiments, at least a portion of the lead body is integral with the first block.

In some embodiments, the lead body extends in a direction in which a corresponding one of the signal lines extends, the lead body comprises a first lead body integral with the corresponding one of the signal lines and the first block, and a second lead body separated from the first lead body, and the array substrate further comprises a plurality of connecting portions, each of the connecting portions connecting the first and second lead bodies of a respective one of the plurality of signal line leads.

In some embodiments, each of the signal line leads further comprises a second block connected to the first block and in a different layer from the first block, and the second block comprises a corresponding one of the plurality of connecting portions.

In some embodiments, each of the signal line leads further comprises a second block connected to the first block and in a different layer from the first block.

In some embodiments, the signal lines comprise gate lines and data lines intersecting the gate lines, the first block is in a same layer and of a same material as the gate lines, and the second block is in a same layer and of a same material as the data lines.

In some embodiments, the signal lines comprise gate lines and data lines, the gate lines intersecting the data lines to define pixel electrodes, the first block is in a same layer and of a same material as the gate lines, and the second block is in a same layer and of a same material as the pixel electrodes.

In some embodiments, the signal lines comprise gate lines and data lines, the gate lines intersecting the data lines to define pixel electrodes, the first block is in a same layer and of a same material as the gate lines, and each of the signal line leads comprises two of the second blocks, one of the two second blocks being in a same layer and of a same material as the data lines, and the other of the two second blocks being in a same layer and of a same material as the pixel electrodes.

In some embodiments, a projection of the second block in a direction perpendicular to the array substrate covers a projection of first block in a direction perpendicular to the array substrate.

In some embodiments, each of the signal line leads comprises a plurality of the second blocks connected to each other.

In some embodiments, the array substrate further comprises an electrostatic discharge line in the non-display area and intersecting the signal line leads, and a plurality of electrostatic protection circuits connected between respective ones of the signal line leads and the electrostatic discharge line.

In some embodiments, the signal line leads comprise gate line leads, and each of the electrostatic protection circuits comprises a first transistor comprising a first gate electrode, a first source electrode, and a first drain electrode, and a second transistor comprising a second gate electrode, a second source electrode, and a second drain electrode. The first transistor and the second transistor are juxtaposed along an direction in which the electrostatic discharge line extends, and the first transistor is closer to the gate line lead than the second transistor. The first source electrode and the second drain electrode are U-shaped structures and are integral with the electrostatic discharge line. The first drain electrode and the second source electrode are in a same layer and of a same material as the electrostatic discharge line, and are an integral structure connected to the gate line lead through a first connection. The first gate electrode and the second gate electrode are in a same layer and of a same material as the gate line lead, the first gate electrode being integral with the gate line lead, and the second gate electrode being connected to the electrostatic discharge line through a second connection.

In some embodiments, the array substrate further comprises a plurality of common electrode lines in the display area, and a common electrode lead in the non-display area and connected to the common electrode lines, the common electrode lead comprising a main lead intersecting the signal line leads.

In some embodiments, the main lead is selected from a group consisting of serving as the electrostatic discharge line and being located at a side of the electrostatic discharge line away from the display area.

In some embodiments, the main lead is at a side of the electrostatic discharge line away from the display area, and the first block is between the main lead and the electrostatic discharge line.

In some embodiments, the main lead is at a side of the electrostatic discharge line away from the display area, and the array substrate further comprises an additional electrostatic protection circuit connected between the electrostatic discharge line and the main lead.

According to another aspect of the present disclosure, a display panel is provided comprising the array substrate as described above.

According to yet another aspect of the present disclosure, a display device is provided comprising the display panel as described above.

These and other aspects of the present disclosure will be apparent from and elucidated with reference to the embodiment(s) described hereinafter.

BRIEF DESCRIPTION OF THE DRAWINGS

Further details, features and advantages of the present disclosure are disclosed in the following description of exemplary embodiments in conjunction with the accompanying drawings in which:

FIG. 4b is a combined illustration of cross-sectional views taken along line O-O', line A-A', and line B-B' in FIG. 4a;

DETAILED DESCRIPTION

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments of the present disclosure will be clearly and completely described below in conjunction with the accompanying drawings.

Figure 1:
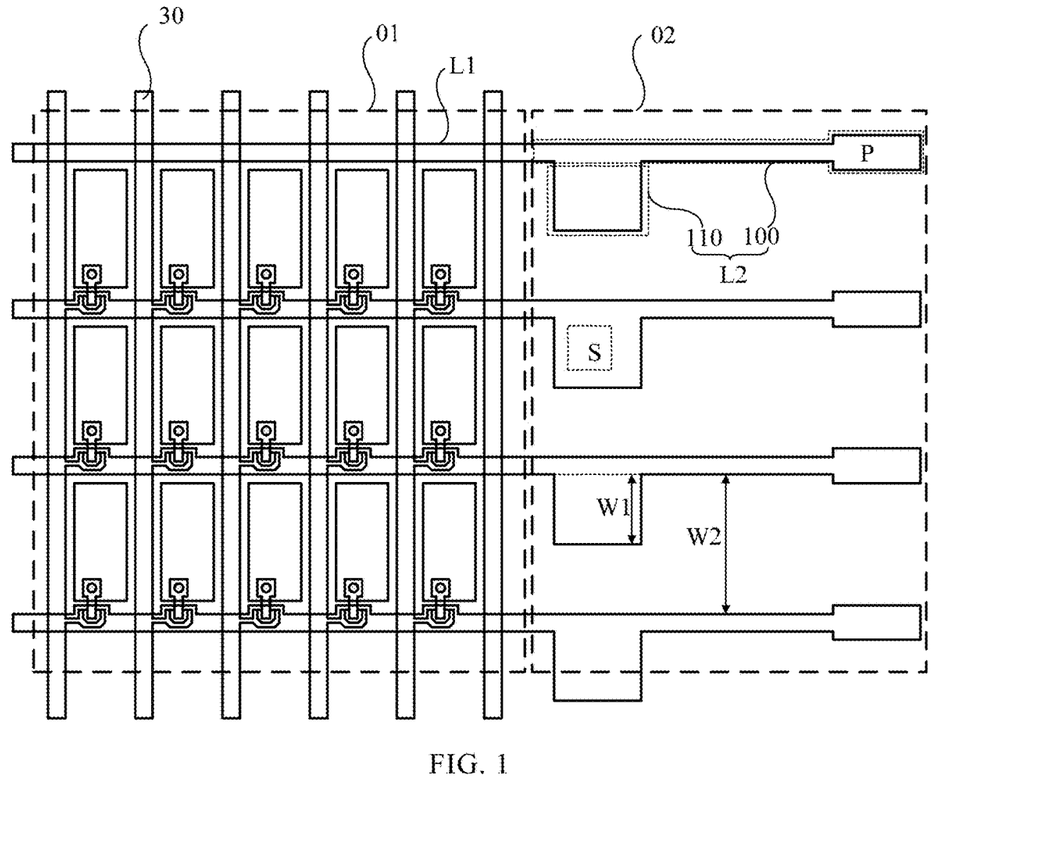
FIG. 1 is a schematic plan view of an array substrate according to an embodiment of the present disclosure.

FIG. 1 is a schematic plan view of an array substrate according to an embodiment of the present disclosure.

As shown in FIG. 1, the array substrate includes a display area 01 and a non-display area 02. Only a partial area of the array substrate is shown in FIG. 1. In embodiments, the non-display area 02 may be an area other than the display area 01. For example, the non-display area 02 may be located at the periphery of the display area 01 and surround the display area 01. The array substrate further includes a plurality of signal lines L1 located in the display area 01, and a plurality of signal line leads L2 located in the non-display area 02 and connected to respective ones of the signal lines L1.

It has been found that the wires in the non-display area 02 are prone to accumulation of a large amount of static charge which can then be transferred into the display area 01, resulting in electrostatic shock to electronic devices in the display area 01. This may cause undesirable damage to the electronic devices in display area 01.

In the embodiment shown in FIG. 1, each of the signal line leads L2 includes a lead body 100 and a first block 110 connected to the lead body 100. Typically, the first block 110 has an area larger than or equal to an area of a square S whose side length is 5 times the width of the signal line L1. This way, the electrostatic charge in the signal lines L1 at the display area 01 and in the signal line leads L2 at the non-display area 02 can be dispersed by the first block 110, thereby reducing the density of the electrostatic charge in the signal lines L1 and the signal line leads L2 and hence the probability of the damage caused by the electrostatic shock.

In the example of FIG. 1, the signal lines L1 are gate lines, and the signal line leads L2 are gate line leads. The gate lead body 100 is provided with a connection terminal P through which the gate lead body 100 is connected to a gate drive circuit (not shown). In the case where the area of the first block 110 is greater than or equal to the area of the square S having a side length that is 5 times the width of the gate line L1, as shown in FIG. 1, the first block 110 has a size W1 in a direction intersecting the extending direction of the gate lines L1 (i.e., a direction in which the data lines 30 extend), which size is smaller than a distance W2 between two adjacent ones of the gate lines L1, and greater than or equal to ⅓ of the distance between the two adjacent gate lines. That is, W2>W1≥⅓ W2. This trades off between the capability of electrostatic protection and the complexity of wiring.

The first block 110 is integral with the lead body 100. In this case, the first block 110 and the lead body 100 are in the same layer and of the same material, and may be formed by a one-time patterning process. This facilitates a simplified process and reduced manufacturing cost. The term patterning process, as used herein, may refer to one or more of photolithography, etching, printing, ink-jetting, and the like. Photolithography refers to a process of forming a pattern by using a photoresist, a mask, an exposure machine, etc., including film formation, exposure, development, and the like. An appropriate process can be selected according to the specific structure.

In embodiments, the shape of the first block 110 is not limited. For example, the first block 110 can be square or rectangular. In embodiments, the types of the signal lines L1 and the signal line leads L2 are not limited. For example, the signal lines L1 may be gate lines, and the signal line leads L2 may be gate line leads. Alternatively or additionally, the signal lines L1 may be data lines, and the signal line leads L2 may be data line leads.

Figure 2:
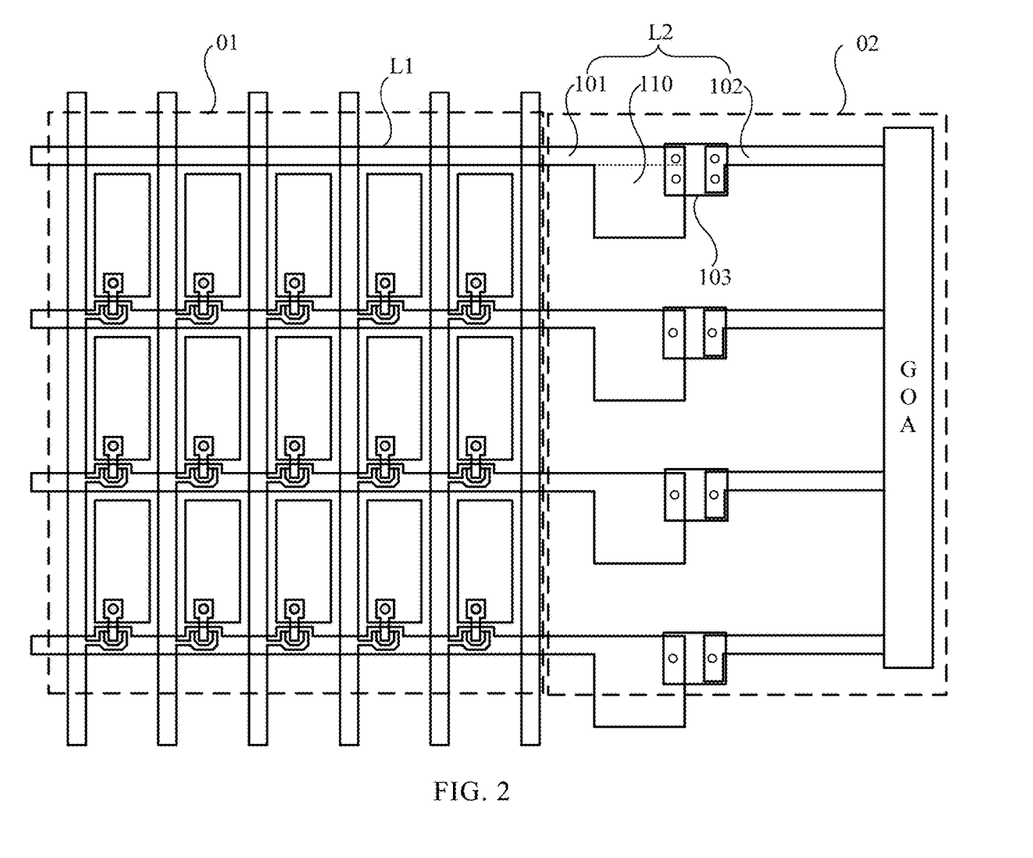
FIG. 2 is a schematic plan view of another array substrate according to an embodiment of the present disclosure.

FIG. 2 is a schematic plan view of another array substrate according to an embodiment of the present disclosure.

In this embodiment, the signal lines L1 are gate lines, and the signal line leads L2 are gate line leads. The lead bodies 100 of the signal line leads L2 extend in the extending direction of the signal lines L1, and each include a first lead body 101 and a second lead body 102 which are separated from each other. As shown in FIG. 2, the first lead body 101 and the second lead body 102 are not in direct contact but are connected together by a connecting portion 103. Thus, the static charge accumulated in the second lead body 102 cannot be transferred to the signal line L1 in the display area 01 through the first lead body 101 before the second lead body 102 is connected to the first lead body 101 through the connection portion 103, thereby further reducing the probability of the damage to the electronic devices in the display area 01 caused by the electrostatic shock.

Also shown in FIG. 2 is a gate drive circuit (GOA) integrated in the array substrate and located in the non-display area 02. In this embodiment, the first lead body 101 is integral with the signal line L1 and the first block 110, and the second lead body 102 is directly connected to an output of the gate drive circuit (GOA). The first lead body 110 may be in the same layer and of the same material as the signal line L1. This way, they can be formed by a one-time patterning process, thus simplifying the process and reducing the manufacturing cost.

Figure 3:
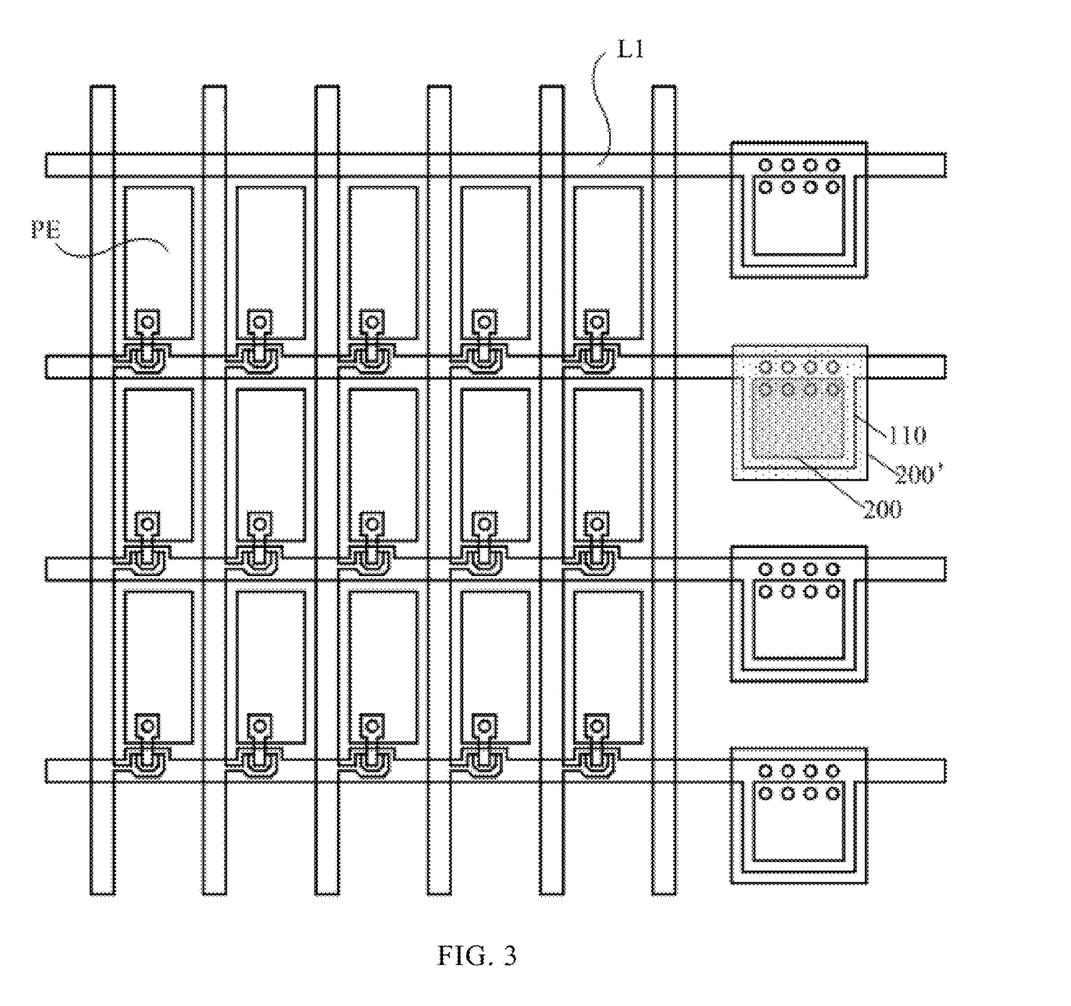
FIG. 3 is a schematic plan view of another array substrate according to an embodiment of the present disclosure.

FIG. 3 is a schematic plan view of another array substrate according to an embodiment of the present disclosure.

As shown in FIG. 3, the array substrate further includes second blocks 200 connected to the first blocks 110, and the second blocks 200 are located in a different layer from the first blocks 110. The second blocks 200 allow for further dispersion of the static charge in the gate lines 10. In an embodiment, the second block 200 may be arranged such that its projection in a direction perpendicular to the array substrate covers the projection of the first block 110 in a direction perpendicular to the array substrate. I.e., the second block 200 has a size larger than the size of the first block 110. This allows for a further efficient dispersion of the electrostatic charge.

In an embodiment, the first block 110 and the second block 200 may be connected by a via or may be in direct contact. In an embodiment, the number of the second blocks 200 included in the signal line leads is not limited. In the example of FIG. 3, in addition to the second block 200, a further second block 200' is shown connected to the first block 100. The signal line lead may include more or fewer second blocks. In the case of a plurality of second blocks, they may be connected to each other by, for example, a via, although the present disclosure is not limited thereto. In addition, the second block bodies 200 and 200' and other conductive structures (e.g., pixel electrodes PE) in the array substrate can be manufactured by a one-time patterning process, thereby simplifying the process and reducing the manufacturing cost.

Figure 4A:
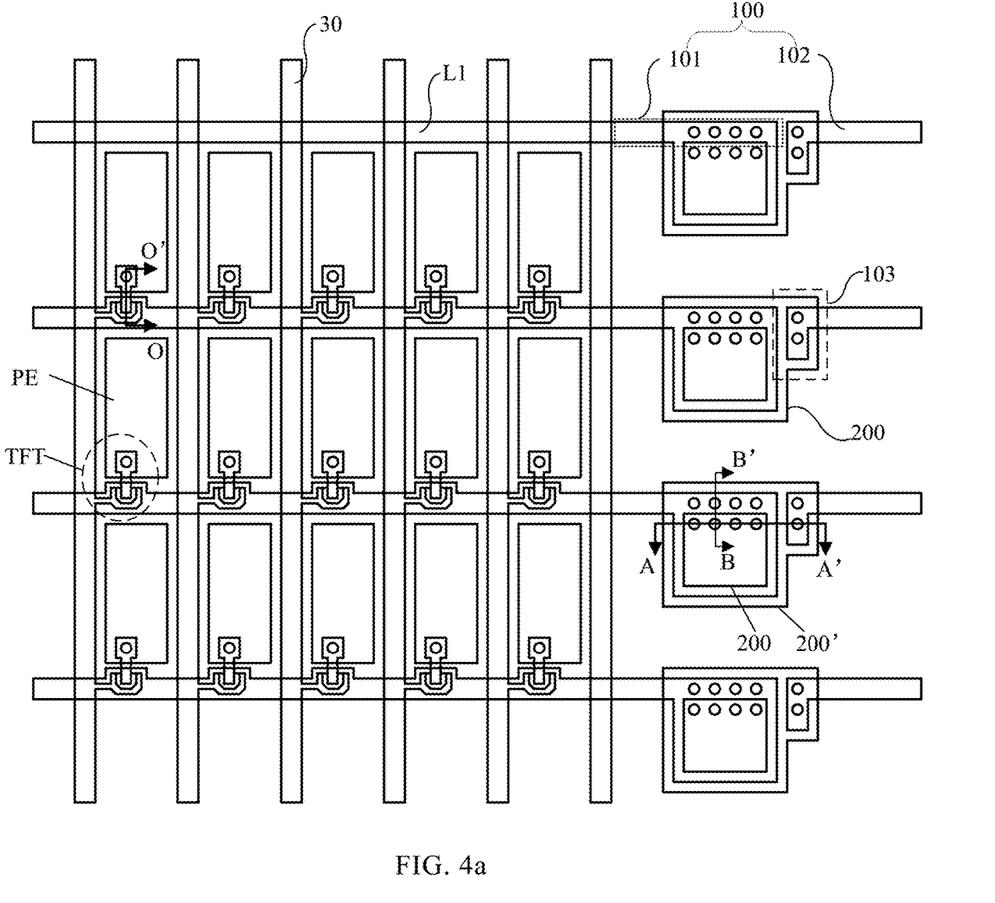
FIG. 4a is a schematic plan view of another array substrate according to an embodiment of the present disclosure.
Figure 4B:
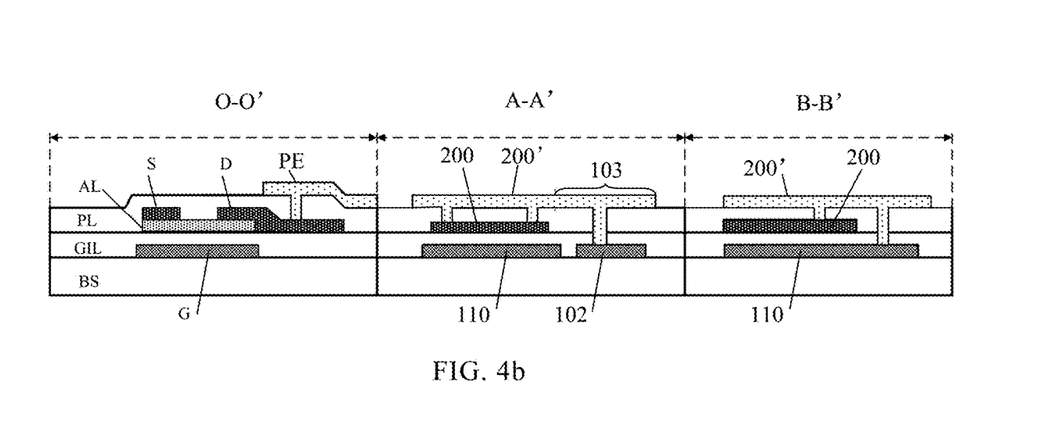

FIG. 4a is a schematic plan view of another array substrate according to an embodiment of the present disclosure, and FIG. 4b is a combined illustration of cross-sectional views taken along line O-O', line A-A', and line BB' in FIG. 4a. An exemplary configuration of the first block 110 and the second block 200 will be further described below in conjunction with FIGS. 4a and 4b.

FIG. 4a shows a plurality of gate lines L1 extending in the horizontal direction and a plurality of data lines 30 intersecting the gate lines L1. The gate lines L1 and the data lines 30 intersect to define a plurality of sub-pixels, and a plurality of thin film transistors TFT are disposed at respective ones of the intersections of the gate lines L1 and the data lines 30. In FIG. 4b, the cross-sectional view, taken along line O-O', shows the connection between the thin film transistor TFT and the pixel electrode PE in one of the sub-pixels. In this example, the thin film transistor is illustrated as a bottom gate type TFT in which a gate electrode a gate insulating layer GIL, an active layer AL, a source electrode S and a drain electrode D, and a passivation layer PL are sequentially formed on a base substrate BS. The present disclosure is not so limited. In other embodiments, the thin film transistor may be a top gate type TFT.

Referring to FIGS. 4a and 4b, the first block 110 is in the same layer and of the same material as the gate line L1 (i.e., the gate electrode G in the thin film transistor), the second block 200 is in the same layer and of the same material as the data line 30 (i.e., the source electrode S and the drain electrode D in the thin film transistor), and the further second block 200' is in the same layer and of the same material as the pixel electrode PE. In this case, the first block 110 and the gate lines may be formed by a one-time patterning process, the second block 200 and the data lines may be formed by a one-time patterning process, and the second block 200' and the pixel electrodes PE may be formed by a one-time patterning process. Further, the second block 200 and the second block 200' are connected by via(s), and the first block 110 and the second block body 200' are connected by a via.

As shown in FIGS. 4a and 4b, the second block 200' includes the connecting portion 103 described above with respect to FIG. 2, except that in the present embodiment the connecting portion 103 and the second block 200' are of an integral structure. This way, the connecting portion 103 functions to disperse the static charge while functioning as a connection. Advantageously, the process can be simplified and the manufacturing cost reduced.

Other embodiments are possible. For example, in the case of only one second block 200, the first block 110 may be in the same layer and of the same material as the gate lines, and the second block 200 may be in the same layer and of the same material as the data lines 30 (i.e., the source electrode and the drain electrode in the thin film transistor). That is, the first block and the gate lines are formed by a one-time patterning process, the second block and the data lines are formed by a one-time patterning process, and the first block 110 and the second block 200 may be connected by a via. Alternatively, the first block 110 may be in the same layer and of the same material as the gate lines, and the second block 200 may be in the same layer and of the same material as the pixel electrodes PE. That is, the first block and the gate lines are formed by a one-time patterning process, the second block 200 and the pixel electrodes PE are formed by a one-time patterning process, and the first block 110 and the second block 200 may be connected by a via.

Figure 5:
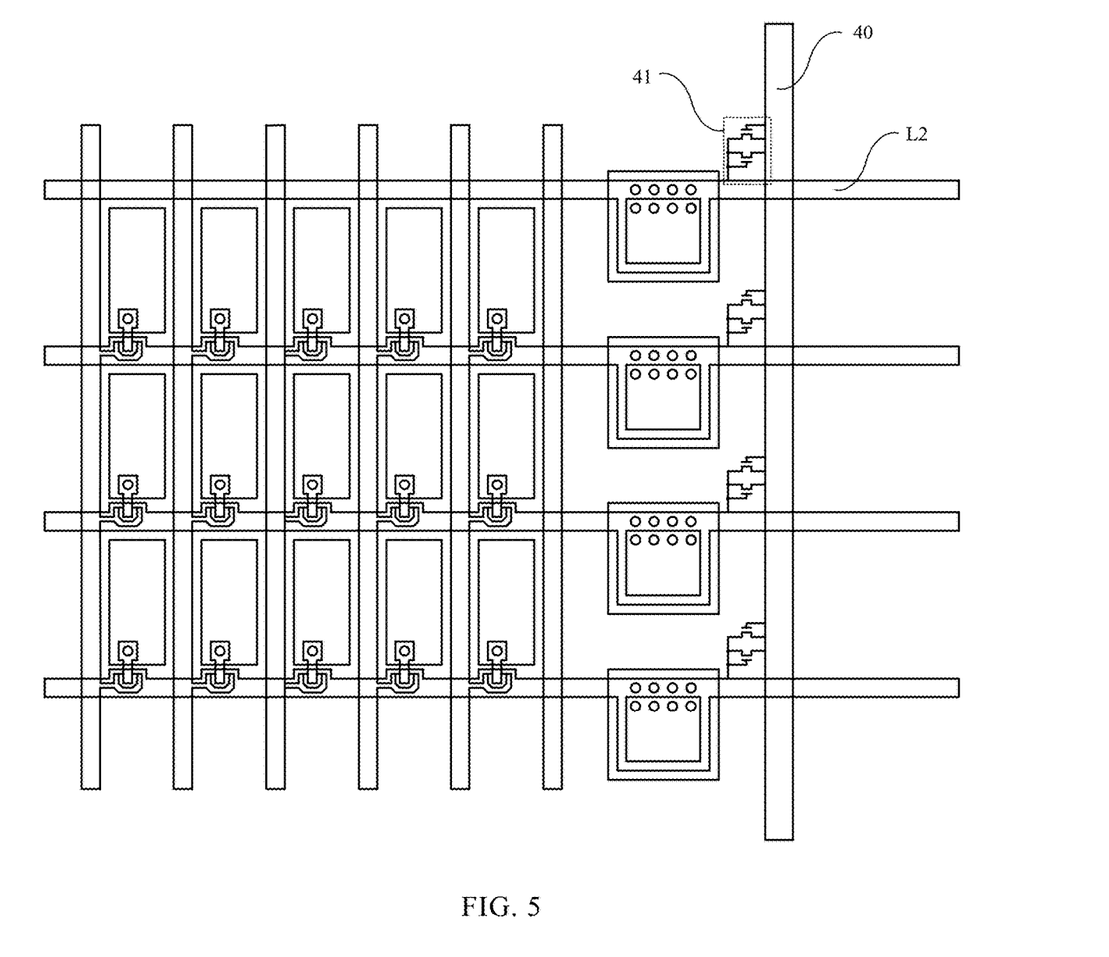
FIG. 5 is a schematic plan view of another array substrate according to an embodiment of the present disclosure.

FIG. 5 is a schematic plan view of another array substrate according to an embodiment of the present disclosure.

As shown in FIG. 5, the array substrate further includes an electrostatic discharge line 40, and the signal line leads L2 are connected to the electrostatic discharge line 40 through electrostatic protection circuits 41. When a certain amount of static charge is accumulated in the gate line leads, the accumulated static charge is delivered to the electrostatic discharge line 40 through the electrostatic protection circuits 41, and in turn, is discharged. In this way, the probability of the damage to the electronic devices in the display area caused by the electrostatic shock is reduced.

Figure 6:
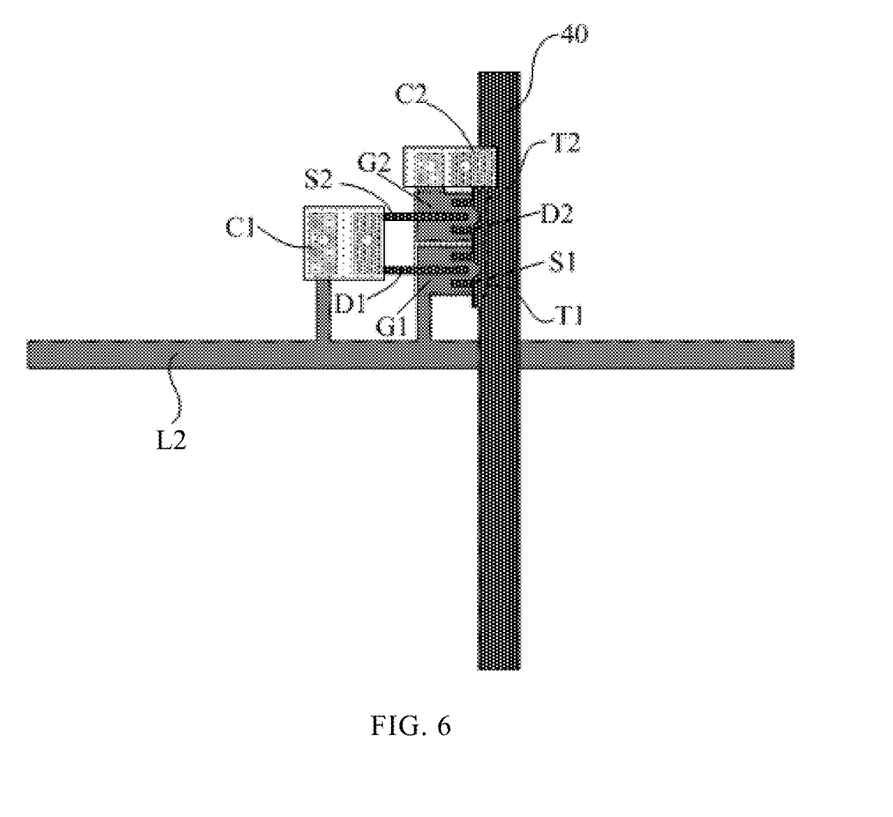
FIG. 6 is a schematic plan view of an electrostatic protection circuit in FIG. 5.

FIG. 6 is an exemplary and schematic plan view of the electrostatic protection circuit of FIG. 5.

Referring to FIG. 6, the electrostatic protection circuit 41 includes a first transistor T1 having a first gate electrode G1, a first source electrode S1, and a first drain electrode D1, and a second transistor T2 having a second gate electrode G2, a second source electrode S2, and a second drain electrode D2.

The first transistor T1 and the second transistor T2 are juxtaposed along the extending direction of the electrostatic discharge line 40, and the first transistor T1 is closer to the gate line lead L2 than the second transistor T2. The first source S1 and the second drain D2 each have a U-shaped structure, both of which are integral with the electrostatic discharge line 40.

The first drain electrode D1 and the second source electrode S2 are in the same layer and of the same material as the electrostatic discharge line 40. The first drain electrode D1 and the second source electrode S2 are of an integral structure, and this integral structure is connected to the gate line lead L2 through a first connection C1.

The first gate electrode G1 and the second gate electrode G2 are in the same layer and of the same material as the gate line lead L2. The first gate electrode G1 and the gate line lead L2 are of an integral structure, and the second gate electrode G2 is connected to the electrostatic discharge line 40 through a second connection C2.

In order to simplify the process, the first connection C1 and the second connection C2 described above may be disposed in the same layer as the pixel electrodes PE. That is, the first connection C1 and the second connection C2 are formed with the pixel electrodes PE by a one-time patterning process.

Figure 7:
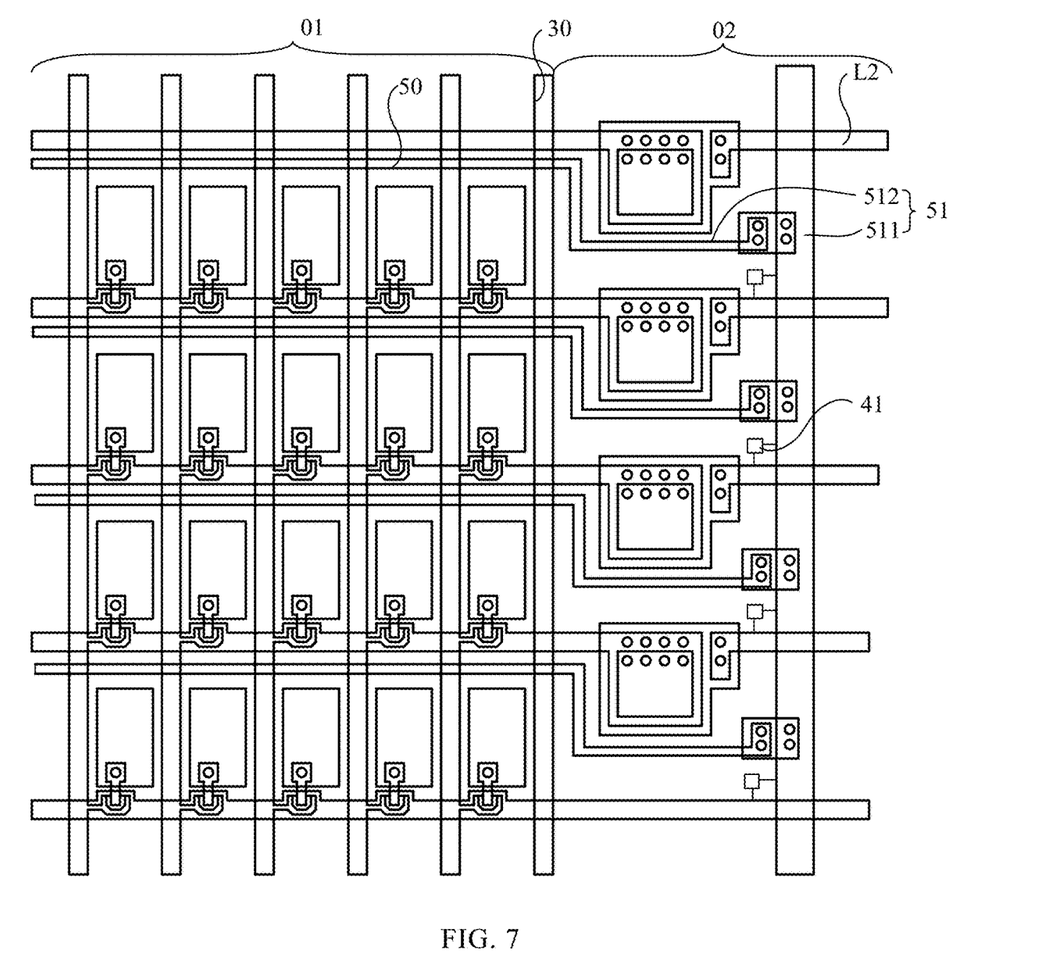
FIG. 7 is a schematic plan view of another array substrate according to an embodiment of the present disclosure.

FIG. 7 is a schematic plan view of another array substrate according to an embodiment of the present disclosure.

As shown in FIG. 7, the array substrate further includes common electrode lines 50 located in the display area 01, and a common electrode lead 51 located in the non-display area 02 and connected to the common electrode lines 50. The common electrode lead 51 includes a main lead 511 and sub-leads 512. The main lead 511 extends in the extending direction of the data lines 30, and the common electrode lines 50 and the sub-leads 512 extend in the extending direction of the gate lines L1. The common electrode lines 50 are connected to the main lead 511 through the sub-leads 512. In general, the common electrode lines 50 and the sub-leads 512 may be of an integral structure, and the main lead 511 and the sub-leads 512 may be connected by connection portions.

In the example of FIG. 7, the main lead 511 of the common electrode lead 51 serves as the electrostatic discharge line 40 described above with respect to FIGS. 5 and 6. Therefore, the main lead 511 and the gate line leads L2 are connected by respective electrostatic protection circuits 41. This is advantageous in reducing the wires in the array substrate, thereby reducing the complexity of the wiring.

Figure 8:
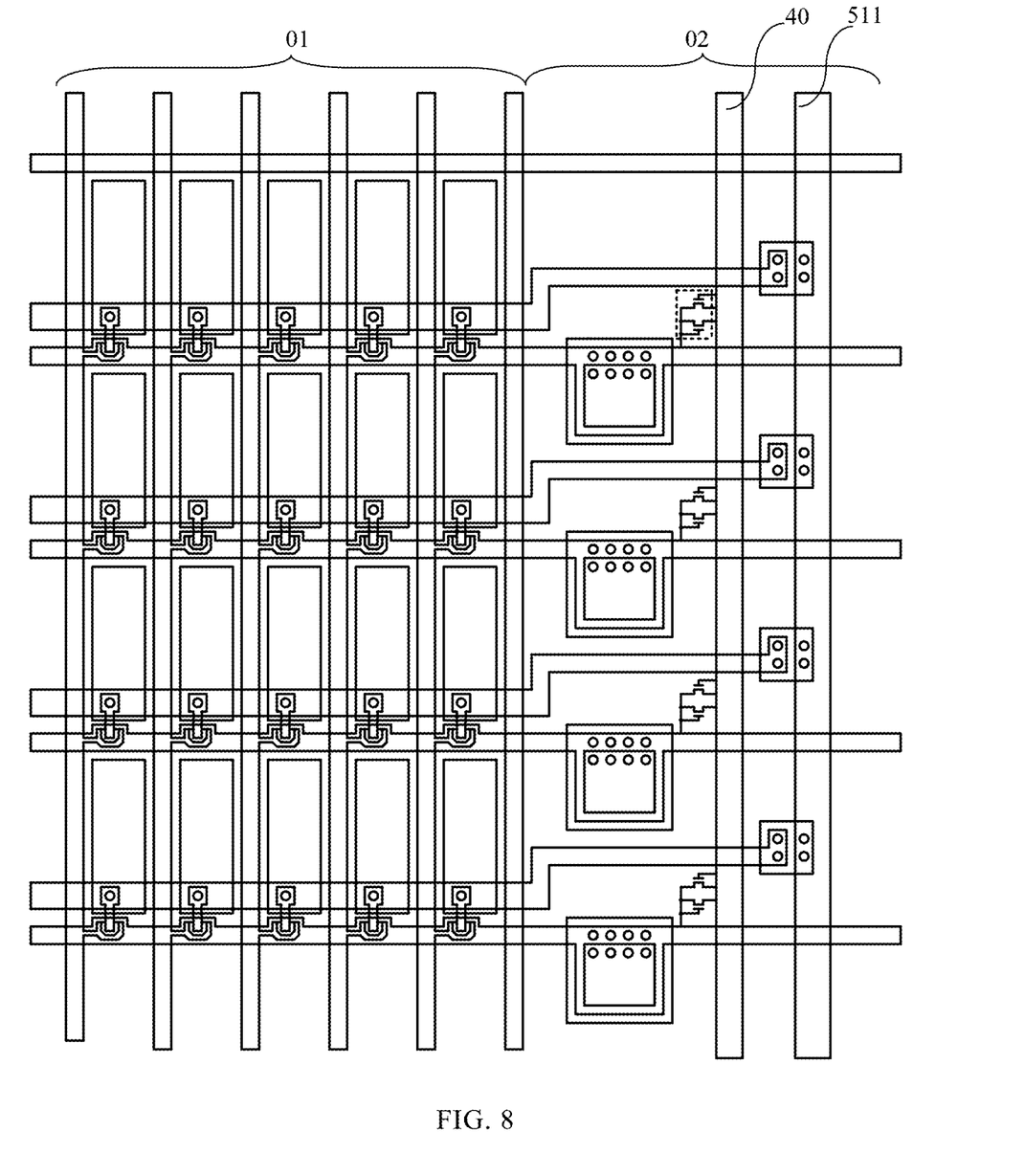
FIG. 8 is a schematic plan view of another array substrate according to an embodiment of the present disclosure.

FIG. 8 is a schematic plan view of another array substrate according to an embodiment of the present disclosure.

Unlike the configuration of FIG. 7, the electrostatic discharge line 40 and the main lead 511 are two different wiring structures, as shown in FIG. 8. This can prevent electrostatic discharge from affecting the common voltage on the common electrode. In an embodiment, the electrostatic discharge line 40 may be disposed on the side of the main lead 511 near the display area 01 for ease of wiring.

Figure 9:
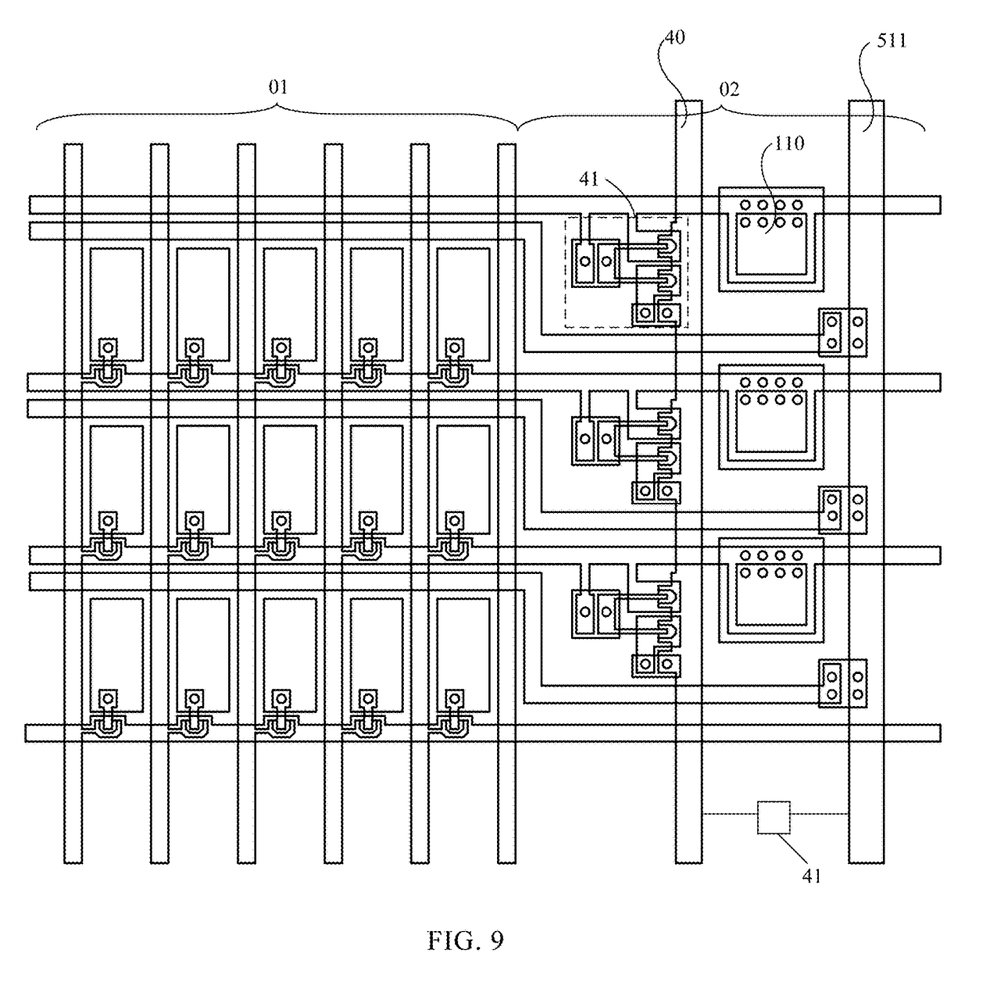
FIG. 9 is a schematic plan view of another array substrate according to an embodiment of the present disclosure.

FIG. 9 is a schematic plan view of another array substrate according to an embodiment of the present disclosure.

As shown in FIG. 9, the first blocks 110 are located between the main lead 511 and the electrostatic discharge line 40. This way, the main lead 511 and the electrostatic discharge line 40 shield the first blocks 110, thereby further reducing the adverse effect of the electrostatic charge in the first block 110 on the display area 01.

Further, as shown in FIG. 9, the electrostatic discharge line 40 is connected to the main lead 511 through an additional electrostatic protection circuit 41. Alternatively, the electrostatic discharge line 40 may be connected to the main lead 511 through a wire. In this way, further dispersion of the electrostatic charge is facilitated.

In embodiments, the gate lines (including the gate electrodes) and other conductive structures in the same layer as the gate lines may be made of one or more of chromium, tantalum, aluminum, titanium, magnesium, or copper, or alloys thereof. The data lines and other conductive structures in the same layer as the data lines may be made of one or more of chromium, tantalum, aluminum, titanium, magnesium or copper, or alloys thereof. The pixel electrodes and other conductive structures in the same layer as the pixel electrodes may be made of one or more of indium tin oxide (ITO), indium gallium zinc oxide (IGZO), or indium zinc oxide (IZO). The gate insulating layer may be made of one or more of silicon nitride, silicon oxide, or silicon oxynitride, and it may be either a single layer structure or a multilayer structure. The passivation layer may be made of one or more of silicon nitride, silicon oxide, or silicon oxynitride, or it may be a resin material. The passivation layer may be either a single layer structure or a multilayer structure. The active layer may be made of a polysilicon (a-Si) material. The present disclosure is not so limited.

Figure 10:
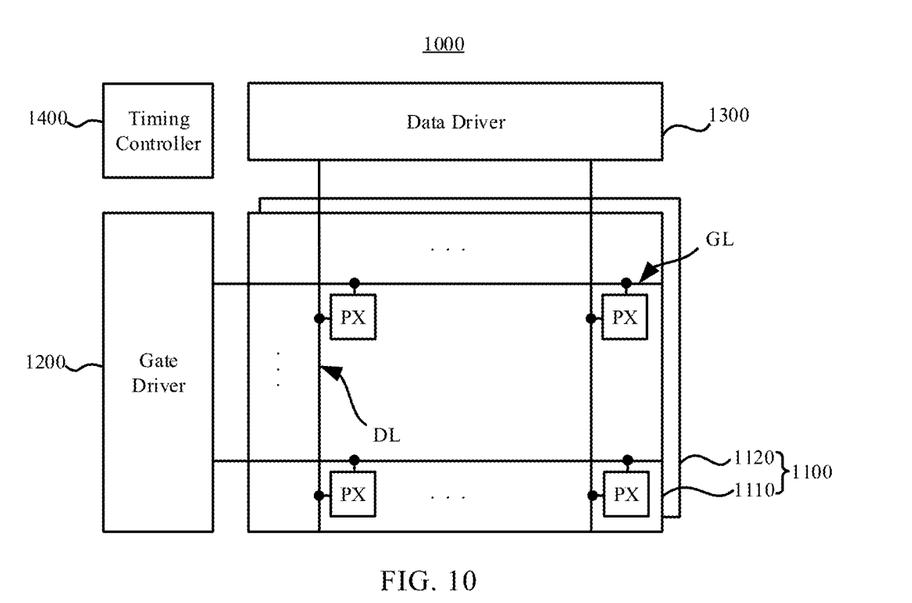
FIG. 10 is a schematic block diagram of a display device according to an embodiment of the present disclosure.

FIG. 10 is a block diagram showing a display device 1000 according to an embodiment of the present disclosure.

Referring to FIG. 10, the display device 1000 includes a display panel 1100 for displaying an image, a gate driver 1200 for outputting gate scan signals to the display panel 1100, a data driver 1300 for outputting data voltages to the display panel 1100, and a timing controller 1400 for controlling the gate driver 1200 and the data driver 1300.

The display panel 1100 includes an array substrate 1110 and a counter substrate 1120 opposite to the array substrate 1110. In the case of a liquid crystal display device, the display panel 110 further includes a liquid crystal layer (not shown) sandwiched between the array substrate 1110 and the counter substrate 1120, and the counter substrate 1120 may be a color filter substrate. In the case of an organic light emitting diode display device, the counter substrate 1120 may be a cover plate. The array substrate 1110 includes a plurality of pixel regions PX arranged in an array. The pixel regions PX are located at respective ones of the intersections of the plurality of gate lines GL and the plurality of data lines DL. Each of the pixel regions includes a pixel including a thin film transistor (not shown) and other associated components. The array substrate 1110 may take the form of any of the array substrates described above with respect to FIGS. 1 to 9.

The gate driver 1200 is electrically connected to first ends of the gate lines GL to sequentially apply gate scan signals to the respective gate lines GL. In some exemplary embodiments, the gate driver 1200 may be directly mounted (e.g., integrated) in the array substrate 1110. Alternatively, the gate driver 1200 may be connected to the display panel 1100 through a Tape Carrier Package (TCP).

The data driver 1300 is electrically connected to first ends of the data lines DL to output data voltages to the respective data lines DL. In some embodiments, the data driver 1300 may include a plurality of data driving chips operating in parallel.

The timing controller 1400 controls the operation of each of the gate driver 1200 and the data driver 1300. Specifically, the timing controller 1400 outputs data control signals and image data to control the driving operation of the data driver 1300, and outputs gate control signals to control the driving operation of the gate driver 1200. The data control signals and image data are applied to the data driver 1300. The gate control signals are applied to the gate driver 1200.

In exemplary embodiments, the display device 1000 may be any product or component having a display function such as a liquid crystal panel, an electronic paper, an OLED panel, a mobile phone, a tablet computer, a television, a display, a notebook computer, a digital photo frame, a navigator, or the like.

The foregoing is only specific embodiments of the present disclosure, and the scope of the present disclosure is not limited thereto. Various changes or substitutions can be made by a person skilled in the art to the disclosed embodiments without departing from the scope of the disclosure. Therefore, the scope of the disclosure should be defined by the appended claims.

What is claimed is:

1. An array substrate, comprising:
a display area;
a non-display area separate from the display area;
a plurality of signal lines in the display area; and
a plurality of signal line leads in the non-display area and connected to respective ones of the plurality of signal lines,
wherein each of the signal line leads comprises a lead body and a first block connected to the lead body,
wherein the first block has a first area greater than or equal to a second area of a square with a side length that is 5 times a width of the signal line,
wherein the signal lines comprise gate lines,
wherein the signal line leads comprise gate line leads,
wherein the first block has a first size in a first direction intersecting a second direction in which the gate lines extend, and
wherein the first size is less than a distance between adjacent ones of the gate lines and is greater than or equal to ⅓ of the distance between the adjacent ones of the gate lines.

2. The array substrate of claim 1, further comprising:
an electrostatic discharge line in the non-display area and intersecting the signal line leads; and
a plurality of electrostatic protection circuits connected between respective ones of the signal line leads and the electrostatic discharge line.

3. The array substrate of claim 2, further comprising:
a plurality of common electrode lines in the display area; and
a common electrode lead in the non-display area and connected to the common electrode lines,
wherein the common electrode lead comprises a main lead intersecting the signal line leads.

4. The array substrate of claim 3, wherein the main lead at least one of serving as the electrostatic discharge line or located at a side of the electrostatic discharge line away from the display area.

5. The array substrate of claim 3,
wherein the main lead is at a side of the electrostatic discharge line away from the display area, and wherein the first block is between the main lead and the electrostatic discharge line.

6. The array substrate of claim 3,
wherein the main lead is at a side of the electrostatic discharge line away from the display area, and
wherein the array substrate further comprises an additional electrostatic protection circuit connected between the electrostatic discharge line and the main lead.

7. The array substrate of claim 2,
wherein the signal line leads comprise gate line leads, and
wherein each of the electrostatic protection circuits comprises:
    a first transistor comprising a first gate electrode, a first source electrode, and a first drain electrode;
    a second transistor comprising a second gate electrode, a second source electrode, and a second drain electrode,
wherein the first transistor and the second transistor are along a direction in which the electrostatic discharge line extends, and the first transistor is closer to a corresponding one of the gate line leads than the second transistor,
wherein the first source electrode and the second drain electrode are U-shaped structures and are integral with the electrostatic discharge line,
wherein the first drain electrode and the second source electrode are in a same first layer and comprise a same first material as the electrostatic discharge line, and are an integral structure connected to the corresponding one of the gate line leads through a first connection, and
wherein the first gate electrode and the second gate electrode are in a same second layer and comprise a same second material as the gate line leads, the first gate electrode being integral with the corresponding one of the gate line leads, and the second gate electrode is connected to the electrostatic discharge line through a second connection.

8. The array substrate of claim 1, wherein at least a portion of the lead body is integral with the first block.

9. The array substrate of claim 8,
wherein the lead body extends in first direction in which a corresponding one of the signal lines extends,
wherein the lead body comprises a first lead body integral with the corresponding one of the signal lines and the first block, and a second lead body separated from the first lead body, and
wherein the array substrate further comprises a plurality of connecting portions, each of the connecting portions connecting the first and second lead bodies of a respective one of the plurality of signal line leads.

10. The array substrate of claim 9,
wherein each of the signal line leads further comprises a second block connected to the first block and in a different layer from the first block, and
wherein the second block comprises a corresponding one of the plurality of connecting portions.

11. The array substrate of claim 1, wherein each of the signal line leads further comprises a second block connected to the first block and in a different layer from the first block.

12. The array substrate of claim 11,
wherein the signal lines comprise gate lines and data lines intersecting the gate lines,
wherein the first block is in a same first layer and comprises a same first material as the gate lines, and
wherein the second block is in a same second layer and comprises a same second material as the data lines.

13. The array substrate of claim 11,
wherein the signal lines comprise gate lines and data lines, the gate lines intersecting the data lines to define pixel electrodes,
wherein the first block is in a same first layer and comprises a same first material as the gate lines, and
wherein the second block is in a same second layer and comprises a same second material as the pixel electrodes.

14. The array substrate of claim 11,
wherein the signal lines comprise gate lines and data lines, the gate lines intersecting the data lines to define pixel electrodes,
wherein the first block is in a same first layer and comprises a same first material as the gate lines, and
wherein each of the signal line leads comprises two of the second blocks, one of the two second blocks being in a same first layer and comprises a same first material as the data lines, and the other of the two second blocks being in a same second layer and comprises a same second material as the pixel electrodes.

15. The array substrate of claim 11, wherein a projection of the second block in a direction perpendicular to the array substrate overlaps a projection of first block in a direction perpendicular to the array substrate.

16. The array substrate of claim 11, wherein each of the signal line leads comprises a plurality of the second blocks connected to each other.

17. A display panel comprising the array substrate of claim 1.

18. A display device comprising the display panel of claim 17.

* * * * *